United States Patent [19]
Erlewine et al.

[11] 3,887,320
[45] June 3, 1975

[54] APPARATUS FOR CONTINUOUSLY FORMING PLASTIC SHEET AND CORRUGATING WITH VACUUM PRESSURE

[75] Inventors: Richard H. Erlewine; Charles W. Richter, III; Arthur J. Calpha, Jr., all of Marion, Ind.

[73] Assignee: General Plastics Corporation, Marion, Ind.

[22] Filed: Apr. 13, 1973

[21] Appl. No.: 350,727

[52] U.S. Cl............................ 425/384; 425/388
[51] Int. Cl............................................. B29c 17/04
[58] Field of Search........ 425/388, 326 R, 224, 336, 425/374, 369, 384, 325; 264/90, 92, 89, 286

[56] References Cited
UNITED STATES PATENTS

| | | | |
|---|---|---|---|
| 3,024,496 | 3/1962 | Colombo | 425/384 X |
| 3,071,180 | 1/1963 | Finger et al. | 425/369 X |
| 3,178,494 | 4/1965 | Tisdale | 425/388 X |
| 3,179,726 | 4/1965 | Perry | 425/388 X |
| 3,226,457 | 12/1965 | Smith | 264/90 |
| 3,471,600 | 10/1969 | Meek | 264/286 X |
| 3,676,263 | 7/1972 | Tisdale | 264/90 X |
| 3,709,647 | 1/1973 | Barnhart | 425/224 |

*Primary Examiner*—Andrew R. Juhasz
*Assistant Examiner*—David B. Smith
*Attorney, Agent, or Firm*—Woodard, Weikart, Emhardt & Naughton

[57] ABSTRACT

An apparatus for forming an extruded plastic sheet with vacuum pressure and without mating dies. The plastic sheet is extruded onto a heated portion of a supporting bed which maintains the sheet in a soft condition. The bed also includes a cooled portion adjacent to the heated portion with a plurality of parallel grooves which extend continuously through the cooled portion and at least partially through the heated portion. A vacuum pressure is provided within the grooves between the bed and sheet thereby pulling the sheet downwardly into the grooves. The residual heat within the sheet is then removed by the cooled portion of the bed to maintain the formed condition of the heated sheet. Various means are provided to maintain the vacuum pressure between the bed and sheet.

5 Claims, 6 Drawing Figures

APPARATUS FOR CONTINUOUSLY FORMING PLASTIC SHEET AND CORRUGATING WITH VACUUM PRESSURE

BACKGROUND OF THE INVENTION

1. Field of the Invention

This invention is in the field of sheet forming devices.

2. Description of the Prior Art

A representative sample of the prior art is disclosed in the following U.S. Pat. Nos.: 2,238,534 issued to A. McDonald; 2,989,780 issued to S. S. Zimmerman; 3,179,726 issued to W. M. Perry; 3,273,203 issued to F. A Ross; and 3,640,666 issued to B. T. Jope, et al.

None of the prior art devices provide a high production capability which may be achieved by immediately forming a plastic sheet which moves onto the forming device immediately from the extruder. By allowing immediate formation of the desired configuration of the sheet as the sheet passes from the extruder, intermediate steps are eliminated with the result that a continuous in line forming is achieved. Traditional forming dies are expensive to produce and to maintain. The invention disclosed herein provides for the formation of the sheet through the use of vacuum pressure without requiring mating forming dies.

By initially extruding a flat plastic sheet, it is also possible between the extruder and the forming bed to laminate a printed overlay film (such as a wood grain pattern of printing) of material onto the extruded sheet prior to the subsequent forming operation.

SUMMARY OF THE INVENTION

One embodiment of the present invention is method of forming grooves in a sheet of plastic comprising the steps of heating the sheet of plastic, moving the sheet of plastic while in a heated condition along a support having grooves thereon, and withdrawing during the moving step air from the grooves of the support creating a vacuum pressure between the sheet and the support and forcing the sheet into the grooves of the support to form grooves in the sheet.

Another embodiment of the present invention is an apparatus for producing grooves in a sheet of plastic comprising a supporting bed for receiving the sheet including a heated portion and an adjacent cooled portion, the bed further including a top surface with a plurality of ridges and grooves formed on the top surface extending through the length of the cooled portion and at least partially through the length of the heated portion, the bed having holes extending through the top surface in the grooves to facilitate air removal, heating means operable to controllably heat the heated portion to maintain the sheet in a soft condition, cooling means operable to controllably cool the cooled portion for the cooling and hardening of the sheet, and air means operable to withdraw air through the holes in the bed creating a vacuum in the grooves of the bed between the sheet and the bed forcing the sheet into the grooves of the bed.

It is an object of the present invention to provide a method for continuously forming extruded sheet.

A further object of the present invention is to provide an apparatus for continuously forming extruded sheet.

In addition, it is an object of the present invention to provide a method and apparatus for forming an extruded plastic sheet with vacuum pressure.

Related objects and advantages of the present invention will be apparent from the following description.

DESCRIPTION OF THE PREFERRED EMBODIMENT

Figure 1:
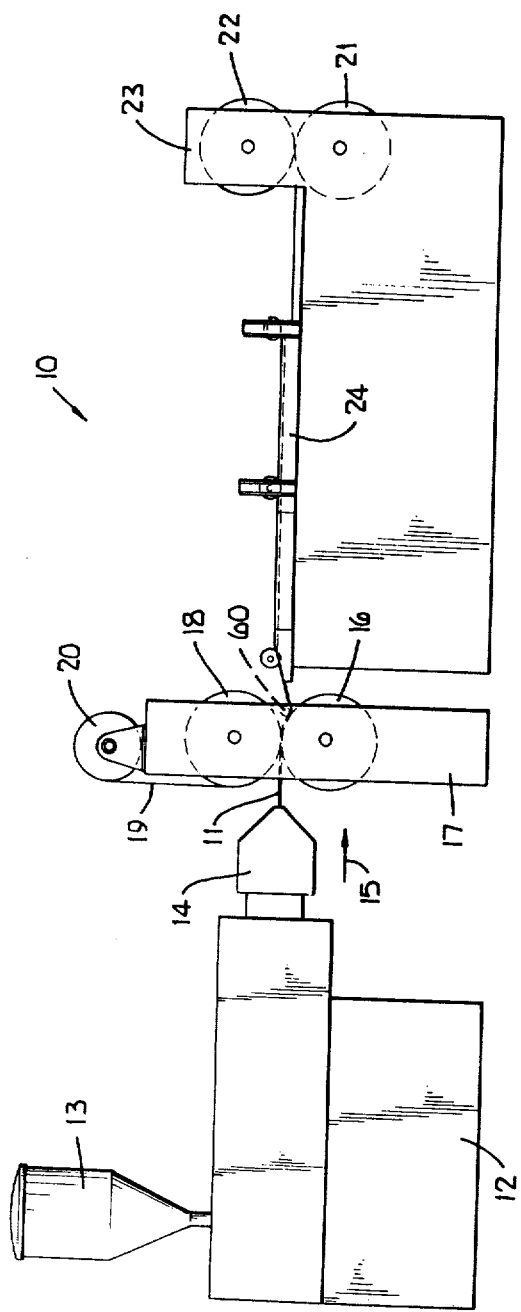
FIG. 1 is a side view of an apparatus incorporating the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

Figure 2:
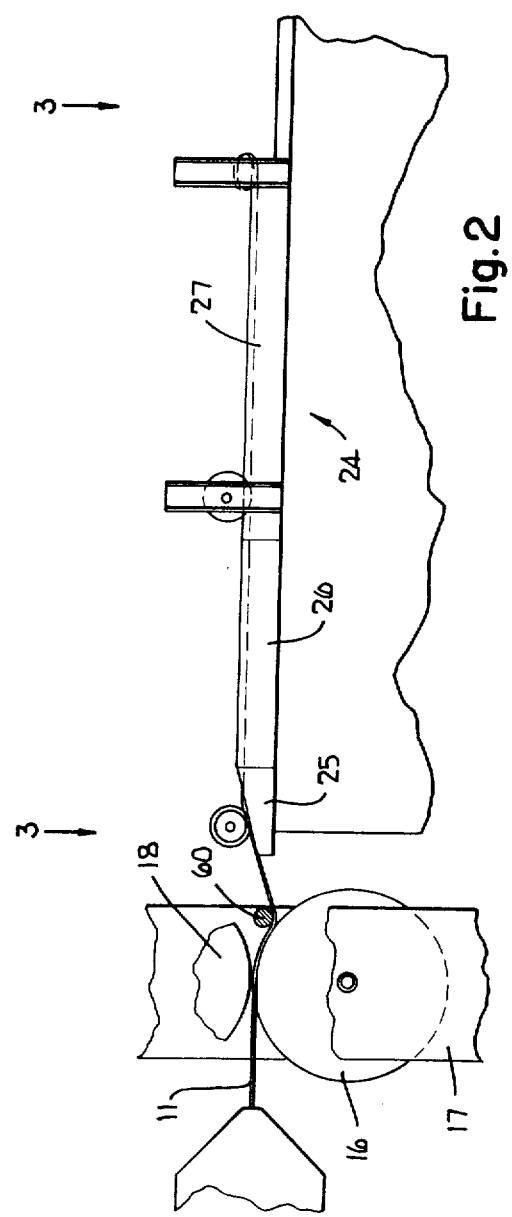
FIG. 2 is a fragmentary enlarged view of that portion of the apparatus of FIG. 1 between the sheeter die and the powered pull rolls.

Referring now more particularly to FIGS. 1 and 2, there is shown an apparatus 10 for forming grooves into a sheet 11 of plastic which is continuously extruded by extruder 12. Plastic granules are placed into the hopper 13 of extruder 12 with sheet 11 then moving out of sheeter die 14 in the direction of arrow 15.

A uniform hot melt of plastic at an approximate temperature of 400° F. emerges from extruder 12 into the sheeter die 14 and onto a continuously moving heated haul-off roll 16 which is rotatably mounted to frame 17. A second roll 18 is rotatably mounted to frame 17 and may be used to laminate an overlay film 19 which extends downwardly from roll 20 so as to be contacted against sheet 11 by laminating roll 18. Roll 16 is variable in speed as are the pair of powered pull rolls 21 and 22 which are rotatably mounted to frame 23. Rolls 16, 21 and 22 are synchronized so as to move sheet 11 across bed 24 at the appropriate speed. By controlling the heating of roll 16, a skin will be imparted to sheet 11 with sufficient heat retained in the sheet to permit subsequent thermal forming of the sheet by vacuum provided on bed 24.

Figure 3:
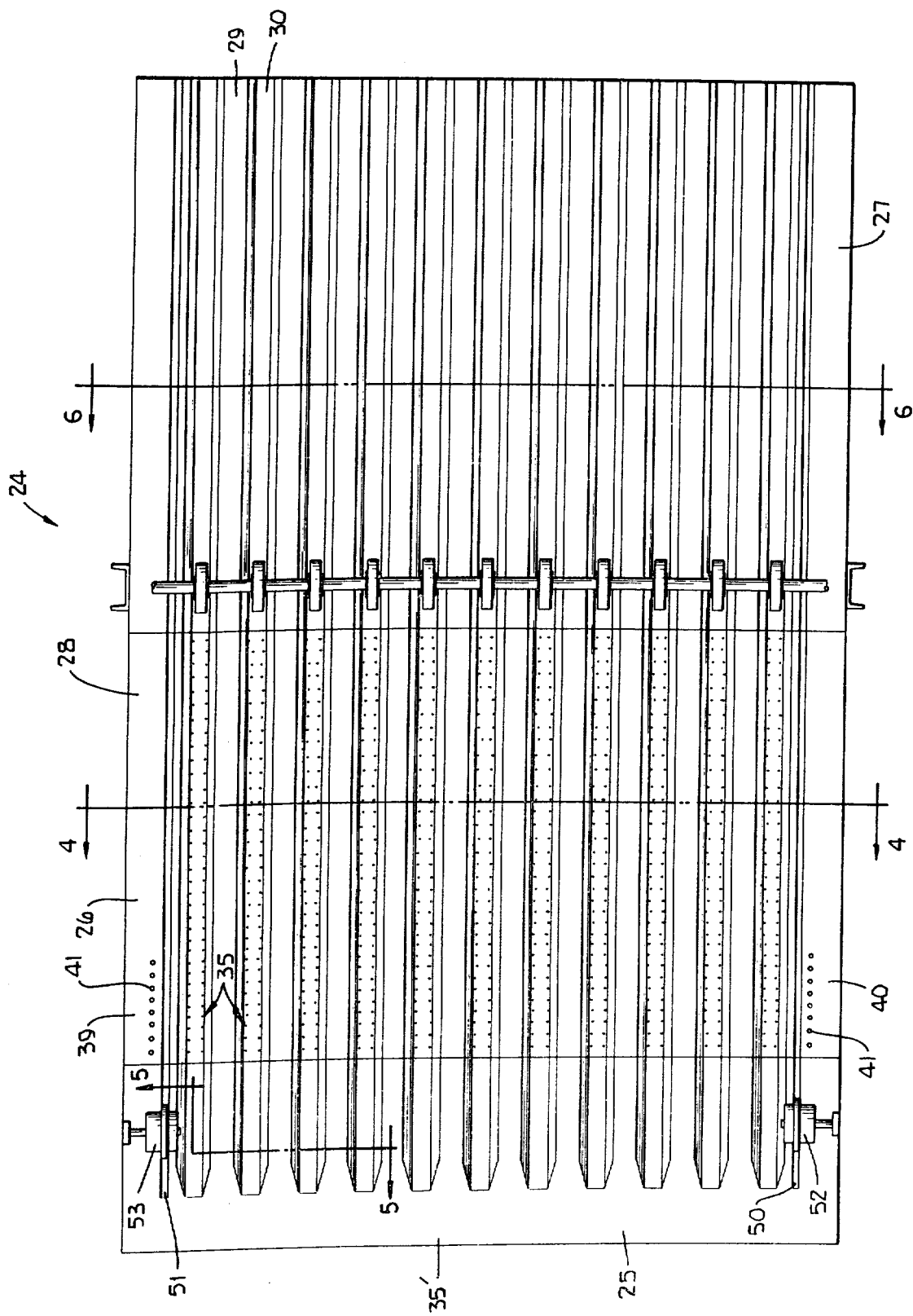
FIG. 3 is an enlarged top view of the supporting bed looking in the direction of arrows 3—3 of FIG. 2

Bed 24 includes a heated portion 25, a cooled portion 26 and an aft supporting portion 27. The top surface 28 of bed 24 is provided with a plurality of ridges 29 and grooves 30 which extend through the length of the aft supporting portion 27 and through the length of the jcocooled portion 26. The ridges and grooves extend only through a portion of the length of the heated portion 25. In the embodiment shown in FIG. 4, ridges 29 include a horizontal top surface 31 with a pair of diverging surfaces 32 and 33 which extend downwardly to the bottom surfaces 34 of the grooves. The height of each ridge 29 is the distance between surfaces 31 and 34 and is constant through the length of the aft supporting portion 27 and the cooled portion 26; however, the height of each ridge decreases through the length of heated portion 25 until top surfaces 31 are blended into surfaces 34 at a location behind the leading edge portion 35' (FIG. 3). As a result, as the hot sheet passes from roller 16 onto the upwardly sloping heated portion 25, the sheet maintains contact across the width of the leading edge portion 35' and is then conveyed upwardly by the upward sloping surfaces 31 of ridges 29. The smooth and hot leading edge portion 35' allows for an airtight seal between the sheet and heated portion 25.

A plurality of holes 35 extend through surfaces 34 of each groove 30. Holes 35 are located at the junctions of surfaces 34 and the upward sloping surfaces 32 and 33. Cooled portion 26 includes a vacuum chamber 36 (FIG. 4) which is in communication with holes 35. Chamber 36 is connected to a suitable vacuum producing device. Thus, as the heated sheet moves along the top surfaces 31 of ridges 29, a vacuum is produced within chamber 36 thereby sucking the sheet downwardly into grooves 30 so as to produce complementary sized grooves in the sheet.

A plurality of passages 37 extend immediately beneath surfaces 31 and 34 and receive circulating cooled liquid. A means such as a pump is utilized to circulate the cooled liquid through passages 37. Likewise, a plurality of passages 38 extend beneath surfaces 31 and 34 in the heated portion 25. Passages 38 are not connected to passages 37 and instead are connected to a suitable source of heated liquid which in turn circulates the heated liquid through passages 38 thereby heating portion 26.

Bed 24 includes a pair of longitudinally extending edge portions 39 and 40 with the ridges and grooves positioned therebetween. The top surfaces of edge portions 39 and 40 have a plurality of apertures 41 extending therethrough which are connected to the vacuum chamber 36. Air is withdrawn through apertures 41 so as to suck the sheet downwardly against edge portions 39 and 40 to effect an airtight seal between the moving sheet and edge portions 39 and 40. This airtight seal in cooperation with the airtight seal existing between the sheet and the smooth leading edge portion 35' prevents air from escaping into the grooves either from the front edge of the bed or either side of the bed. As will be described later in this specification, a plurality of wheels force the formed sheet against surfaces 34 of the groove at the aft supporting portion 27 thereby preventing escape of air into the grooves from the rear portion of the bed.

Figure 5:
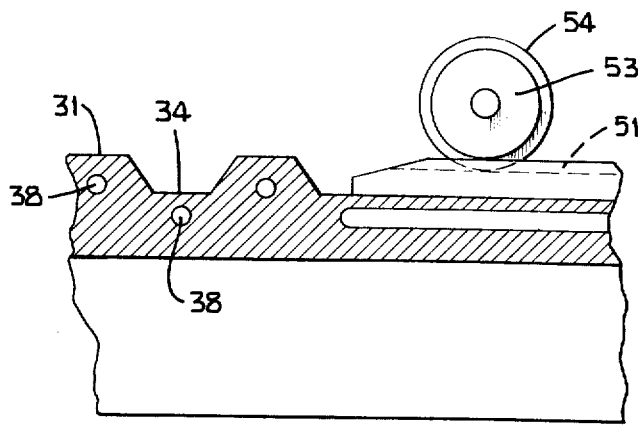
FIG. 5 is a cross sectional view taken along the line 5—5 of FIG. 3 and viewed in the direction of the arrows.
Figure 6:
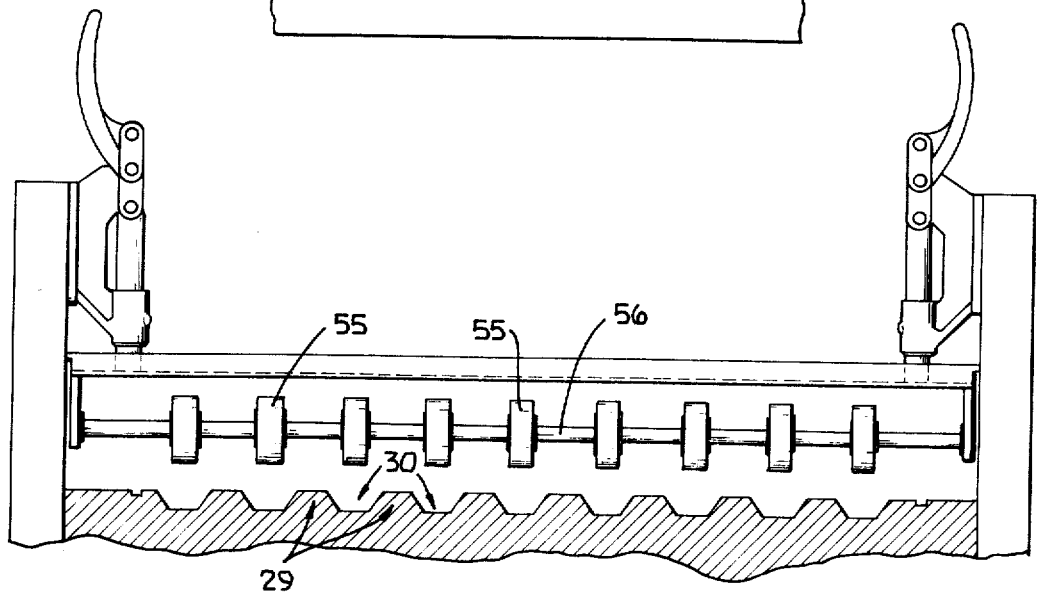
FIG. 6 is a cross sectional view taken along the line 6—6 of FIG. 3 and viewed in the direction of the arrows.

A pair of slots 50 and 51 (FIG. 3) are provided in edge portions 40 and 39. Slots 50 and 51 extend the length of bed 24 with the exception of the leading edge portion 35'. The slots are positioned inwardly of apertures 41. A pair of rollers 52 and 53 are rotatably mounted above heated portion 25 with each roller having a circumferentially extending ridge which is received by the slots. For example, roller 53 has a circumferentially extending ridge 54 (FIG. 5) which extends into slot 51. The sheet passes between the bed and rollers 52 and 53 with the ridges on the rollers forcing a portion of the sheet downwardly into slots 50 and 51 thereby slidably locking the sheet to the bed as the sheet moves through the length of the bed. The portion of the sheet forced downwardly into slots 50 and 51 may then be subsequently severed from the main body of the sheet subsequent to the final forming of the sheet.

Figure 4:
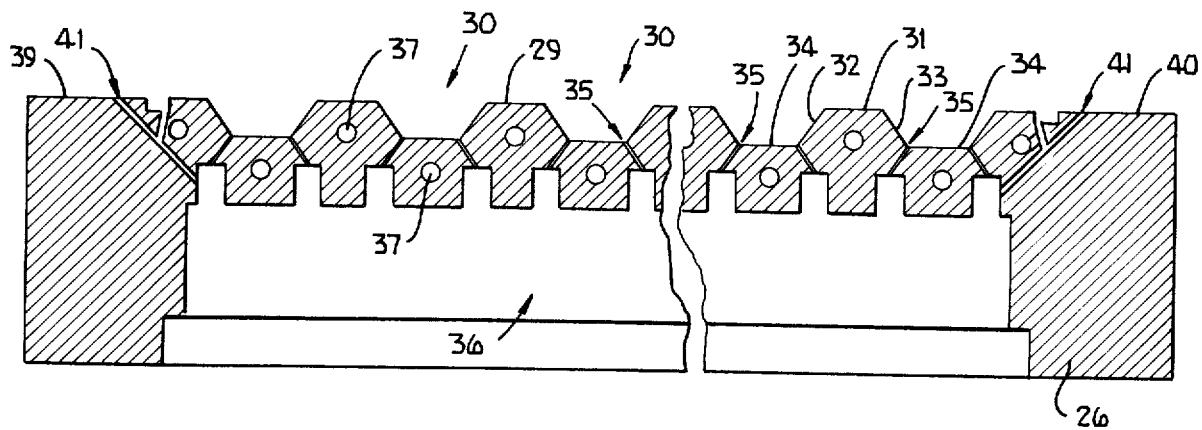
FIG. 4 is a cross sectional view taken along the line 4—4 of FIG. 3 and viewed in the direction of the arrows.

A plurality of rotatably mounted wheels 55 are mounted to axle 56 which is rotatably mounted above supporting portion 27 of bed 24. Suitable means are provided to control the vertical movement of axle 56. As a result, wheels 55 may be positioned downwardly into grooves 30 thereby forcing the formed sheet against surface 34 (FIG. 4). Thus, escape of air into the grooves from the aft section of the bed is prevented thereby ensuring the integrity of the vacuum existing within the grooves between the bed and sheet.

As previously explained, as the extruded sheet moves continuously over the bed, sufficient vacuum must exist between the bed and sheet so as to provide continuous thermal forming of the sheet as it is pulled downstream over the bed. The cooled portion of the bed contains both the controlled vacuum and the liquid chill. The vacuum existing between cooled portion 26 and the sheet travels up to the heated portion 25 where it is sealed off by the action of the heat controlled doctor bar 60 (FIG. 2) which is directly in front of the heated portion 25 and under which the sheet must travel to effect the vacuum seal at the leading edge of heated portion 25. Doctor bar 60 (FIG. 1) is lower in elevation than the top surface of bed 24 thereby forcing the sheet downwardly as it passes from roll 17 onto heated portion 25. As the sheet moves over heated portion 25, the peripheral edges of the sheet are locked and sealed to the top surface of the heated portion 25 to prevent the action of the vacuum from drawing the sheet inwardly in such a manner so as to break the vacuum seal. As discussed, the slots are provided on both sides of the bed to receive the rotatably mounted ridged wheels to effect a seal at the peripheral edges of the sheet and prevent any change in width of the sheet. The cooled portion 26 must be sufficiently cool so as to remove residual heat from the sheet during its total contact period with the cooled portion and at a sufficient rate to lower the temperature of the sheet to below the distortion temperature of the resin (approximately 140° F.) so that the sheet will retain the profile shape thereafter during its transportation downstream. Precise control of the vacuum pressure between the sheet and bed is important to prevent total lockup of the sheet at the heated portion and at the cooled portion. A high degree of chill capacity is essential to maximize production rate.

Many variations of the present invention are contemplated and included herein although not shown. For example, in one embodiment, trim knives are mounted downstream of the rotatably mounted wheels 55 to remove the peripheral edge portions of the sheets and to trim continuously the desired width of panel. The powered pull rolls 21 and 22 (FIG. 1) must move the sheet at a continuous synchronized speed with roll 16 and with sufficient frictional action on the formed sheet so as to overcome the frictional effect of the vacuum pressure exerted against the panel at the heated portion and cooled portion. Eventually, the continuously formed sheet is moved past a cutoff saw table and trimmed to length automatically by action of a limit switch.

The method of forming the grooves in a sheet of plastic includes extruding the sheet of material and then heating the extruded sheet. The heating of the sheet occurs when the sheet is supported by the bed with the sheet then moving along the bed which withdraws air from between the sheet and bed thereby forcing the sheet into grooves in the bed. Longitudinally extending edges of the sheet are contacted against the bed to effect an airtight seal therebetween during the moving of the sheet and during the creation of the vacuum pressure between the sheet and bed. The forward portion of the bed is continuously contacted across the width of the sheet to effect an airtight seal therebetween. The sheet is subsequently cooled.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An apparatus for producing grooves in a sheet of plastic comprising:
 a supporting bed for receiving said sheet including a heated portion and an adjacent cooled portion, said bed further including a top surface with a plurality of ridges and grooves formed on said top surface extending through the length of said cooled portion and at least partially through the length of said heated portion, said bed having holes extending through said top surface in said grooves to facilitate air removal;
 heating means operable to controllably heat said heated portion to maintain said sheet in a soft condition;
 cooling means operable to controllably cool said cooled portion for the cooling and hardening of said sheet;
 air means operable to withdraw air through said holes in said bed creating a vacuum in said grooves of said bed between said sheet and said bed forcing said sheet into said grooves of said bed;
 said bed including a pair of longitudinally extending edge portions with said ridges and grooves positioned therebetween, said edge portions having top surfaces with passages extending therethrough connected to said air means which is operable to withdraw air through said passages effecting an airtight seal between said edge portions and said sheet moving thereon and further comprising:
 said edge portions each having a slot extending the length thereof; and
 pressure means projecting into said slot with said sheet forced between said pressure means and said slot.

2. The apparatus of claim 1 wherein said heating means includes passages extending through said bed with heated fluid circulated therethrough, said cooling means includes passages extending through said bed with coolant extending therethrough.

3. The apparatus of claim 1 wherein each groove is positioned between two of said ridges with each groove having a bottom flat wall and with said ridges having diverging walls extending upwardly and outwardly from said bottom flat wall, said holes to facilitate air removal are located at opposite longitudinal extending edge portions of said flat bottom wall adjacent said diverging walls.

4. An apparatus for producing grooves in a sheet of plastic comprising:
 a supporting bed for receiving said sheet including a heated portion and an adjacent cooled portion, said bed further including a top surface with a plurality of ridges and grooves formed on said top surface extending through the length of said cooled portion and at least partially through the length of said heated portion, said bed having holes extending through said top surface in said grooves to facilitate air removal;
 heating means operable to controllably heat said heated portion to maintain said sheet in a soft condition;
 cooling means operable to controllably cool said cooled portion for the cooling and hardening of said sheet; and,
 air means operable to withdraw air through said holes in said bed creating a vacuum in said grooves of said bed between said sheet and said bed forcing said sheet into said grooves of said bed;
 said ridges having a constant height on said cooled portion and a decreasing height on said heating portion, said heated portion having a smooth leading edge portion with said ridges blended smoothly into said leading edge portion;
 said sheet being extruded and conveyed onto said heated portion;
 said bed including a pair of longitudinally extending edge portions with said ridges and grooves positioned therebetween, said edge portions having top surfaces with passages extending therethrough connected to said air means which is operable to withdraw air through said passages effecting an airtight seal between said edge portions and said sheet moving thereon and further comprising:
 means operable to contact said sheet and move said sheet along the length of said bed;
 said edge portions each having a slot extending the length thereof and further comprising:
 a pair of rollers rotatably mounted over said bed with said rollers each having a circumferential ridge extending into said slot with said sheet forced between each roller ridge and each slot.

5. The apparatus of claim 4 and further comprising:
 a plurality of rotatably mounted wheels aft of said heated portion and extending into said grooves to force said sheet against said bed and effect an airtight seal therebetween.

* * * * *